US012495263B2

(12) United States Patent
Lee et al.

(10) Patent No.: US 12,495,263 B2
(45) Date of Patent: Dec. 9, 2025

(54) ELECTRONIC DEVICE FOR CONVERTING NUMBER OF AUDIO CHANNELS, AND ELECTRONIC DEVICE OPERATING METHOD

(71) Applicant: SAMSUNG ELECTRONICS CO., LTD., Suwon-si (KR)

(72) Inventors: Soonkyu Lee, Suwon-si (KR); Taemin Kwon, Suwon-si (KR); Jinyoung Kim, Suwon-si (KR); Dongmoon Ok, Suwon-si (KR); Jongmin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 340 days.

(21) Appl. No.: 18/101,889

(22) Filed: Jan. 26, 2023

(65) Prior Publication Data
US 2023/0188917 A1 Jun. 15, 2023

Related U.S. Application Data

(63) Continuation of application No. PCT/KR2021/001840, filed on Feb. 10, 2021.

(30) Foreign Application Priority Data

Jul. 27, 2020 (KR) .................. 10-2020-0092795

(51) Int. Cl.
*H04S 5/02* (2006.01)
*G06F 3/16* (2006.01)
(Continued)

(52) U.S. Cl.
CPC ............. *H04S 5/02* (2013.01); *G06F 3/162* (2013.01); *H04S 1/007* (2013.01); *H04S 3/008* (2013.01); *H04S 2400/01* (2013.01)

(58) Field of Classification Search
CPC . H04S 5/02; H04S 1/007; H04S 3/008; H04S 2400/01; H04S 5/005; H04S 1/00;
(Continued)

(56) References Cited

U.S. PATENT DOCUMENTS 5,488,418 A    1/1996  Mishima et al.
6,470,087 B1  10/2002  Heo et al.
(Continued)

FOREIGN PATENT DOCUMENTS

EP        0869681 B1    6/2005
JP     2002112382 A    4/2002
(Continued)

OTHER PUBLICATIONS

International Search Report (ISA/210) issued May 21, 2021 by the International Searching Authority in International Application No. PCT/KR2021/001840.
(Continued)

*Primary Examiner* — Yosef K Laekemariam
(74) *Attorney, Agent, or Firm* — Sughrue Mion, PLLC

(57) ABSTRACT

An electronic device includes: an Application Processor (AP) including a CPU; and an audio processing unit configured to: receive an audio stream of M channels from the CPU, convert the M-channel audio stream into an N-channel audio stream, the N-channel being different from the M-channel, output the N-channel audio stream through an output device. The audio processing unit is further configured to: detect a connection with the external electronic device through an audio output interface; determine whether to stop the converting the M-channel audio stream into the N-channel audio stream, based on information received from the CPU; and transmit, via the audio output interface, the M-channel audio stream to the external electronic device in response to the determination of stopping the converting
(Continued)

the M-channel audio stream into the N-channel audio stream.

14 Claims, 8 Drawing Sheets

(51) Int. Cl.
*H04S 1/00* (2006.01)
*H04S 3/00* (2006.01)

(58) Field of Classification Search
CPC . H04S 3/00; G06F 3/162; G06F 3/165; G06F 3/16; H04R 2420/05; G10L 19/008; G10L 19/167
See application file for complete search history.

(56) References Cited

U.S. PATENT DOCUMENTS

| | | | |
|---|---|---|---|
| 7,680,290 | B2 | 3/2010 | Ko et al. |
| 7,949,141 | B2 | 5/2011 | Reilly et al. |
| 8,213,630 | B2 | 7/2012 | Yoshizawa et al. |
| 9,693,168 | B1 | 6/2017 | Carlsson et al. |
| 9,699,562 | B2 | 7/2017 | Kim et al. |
| 10,009,687 | B2 | 6/2018 | Lee et al. |
| 10,645,521 | B2 | 5/2020 | Mihelich et al. |
| 11,006,210 | B2 | 5/2021 | Ko et al. |
| 2004/0062401 | A1 | 4/2004 | Davis |
| 2004/0071059 | A1 | 4/2004 | Kikuchi et al. |
| 2006/0104452 | A1 | 5/2006 | Park |
| 2006/0104617 | A1* | 5/2006 | Mukaide ................ H04N 5/775 386/E5.07 |
| 2007/0127738 | A1 | 6/2007 | Yamada et al. |
| 2007/0297519 | A1 | 12/2007 | Thompson et al. |

FOREIGN PATENT DOCUMENTS

| | | | | |
|---|---|---|---|---|
| JP | 2004023549 | A | 1/2004 | |
| JP | 2005184040 | A | 7/2005 | |
| JP | 2006033847 | A | 2/2006 | |
| JP | 2007282053 | A | 10/2007 | |
| JP | 4431308 | B2 | 3/2010 | |
| JP | 5084264 | B2 | 11/2012 | |
| KR | 1998026198 | A | 7/1998 | |
| KR | 2000-0033481 | A | 6/2000 | |
| KR | 20000033481 | * | 6/2000 | ............ G11B 20/10 |
| KR | 1020040046197 | A | 6/2004 | |
| KR | 100443405 | B1 | 8/2004 | |
| KR | 1020060055132 | A | 5/2006 | |
| KR | 1020060096574 | A | 9/2006 | |
| KR | 10-2010-0096537 | A | 9/2010 | |
| KR | 1020120016981 | A | 2/2012 | |
| KR | 1020150041974 | A | 4/2015 | |
| KR | 1020150056120 | A | 5/2015 | |
| KR | 101564288 | B1 | 10/2015 | |
| KR | 101880844 | B1 | 7/2018 | |
| KR | 1020190062902 | A | 6/2019 | |

OTHER PUBLICATIONS

Communication issued on Dec. 6, 2023 by European Patent Office in corresponding European Patent Application No. 21849969.7.
Communication dated Oct. 22, 2024 issued by the Korean Patent Office in Application No. 10-2020-0092795.
Communication dated Jun. 28, 2025 issued by the Korean Intellectual Property Office in Korean Patent Application No. 10-2020-0092795.

* cited by examiner

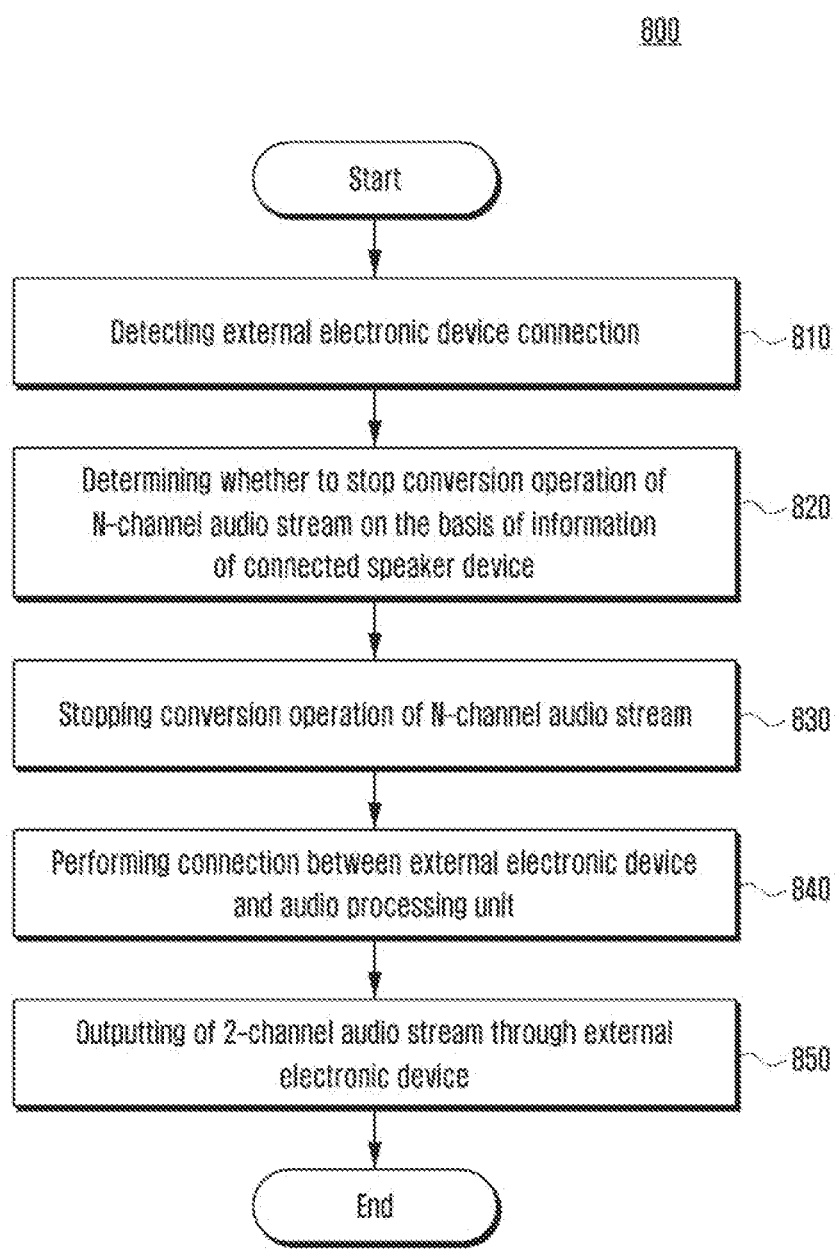

ELECTRONIC DEVICE FOR CONVERTING NUMBER OF AUDIO CHANNELS, AND ELECTRONIC DEVICE OPERATING METHOD

CROSS-REFERENCE TO RELATED APPLICATIONS

This application is a by-pass continuation application of International Application No. PCT/KR2021/001840, filed on Feb. 10, 2021, which based on and claims priority to Korean Patent Application No. 10-2020-0092795, filed on Jul. 27, 2020, in the Korean Intellectual Property Office, the disclosures of which are incorporated by reference herein in their entireties.

BACKGROUND

1. Field

The present disclosure relates to a technology of converting the number of audio channels and outputting the converted audio through an output device in respect to an electronic device and an operating method of the electronic device.

2. Description of Related Art

Various types of electronic devices such as smart phone, tablet Personal Computer (PC), Portable Multimedia Player (PMP), Personal Digital Assistant (PDA), laptop PC and wearable device have been introduced.

Electronic devices may apply various technologies to provide realistic content to users. As an example, an electronic device may include a plurality of speakers to provide realistic audio to a user. The electronic device may provide audio having a higher channel through a plurality of speakers, and the user may receive audio of a higher channel through the plurality of speakers.

However, most of the audio in circulation is 2-channel audio, and electronic devices convert 2-channel audio into N channel (e.g., 4 channels) audio. The electronic device may output the converted N-channel audio through a plurality of speakers.

An electronic device may perform a processing operation of converting 2-channel audio into N-channel audio in a Central Processing Unit (CPU). The central processing unit may take a high load by processing various operations including an operation to change the number of audio channels and there may occur circumstances where various processing operations including audio output may not be processed within the required time.

The electronic device may terminate the N-channel audio conversion operation in a case that an external electronic device supporting a different number of channels from the number of channels of the currently outputting audio is connected while the electronic device is outputting N-channel audio. The delay time of the audio output may increase in accordance with the time required for terminating the N-channel audio conversion and resetting the component that processes the audio data.

SUMMARY

According to an aspect of the disclosure, an electronic device includes: an output device configured to output audio; an audio output interface configured to receive the audio from the output device and to forward the audio to an external electronic device; an Application Processor (AP) including a CPU; and an audio processing unit configured to: receive an audio stream of M channels from the CPU, convert the M-channel audio stream into an N-channel audio stream, the N-channel being different from the M-channel, output the N-channel audio stream through the output device. The audio processing unit is further configured to: detect a connection with the external electronic device through the audio output interface; determine whether to stop the converting the M-channel audio stream into the N-channel audio stream, based on information received from the CPU; and transmit, via the audio output interface, the M-channel audio stream to the external electronic device in response to the determination of stopping the converting the M-channel audio stream into the N-channel audio stream.

According to another aspect of the disclosure, a method for operating an electronic device, includes: receiving a M-channel audio stream from a Central Processing Unit (CPU); converting the M-channel audio stream into an N-channel audio stream; outputting the N-channel audio stream to an output device supporting N-channel audio output; determining where to stop converting the M-channel audio stream into the N-channel audio stream based on information received from the CPU in response to connection of an external electronic device supporting audio having a number of channels that are different from the N-channel; and transmitting the M-channel audio stream to the external electronic device in response to the determination to stop converting the M-channel audio stream into the N-channel audio stream.

An electronic device and an operating method of the electronic device according to one or more embodiments of the present disclosure may perform an operation of converting 2-channel audio into N-channel audio or converting N-channel audio to 2-channel audio (e.g., N=4) in a separate audio processing unit implemented on an application processor instead of a Central Processing Unit (CPU). Accordingly, even in a state where the CPU is heavily loaded, various processing operations including audio output may be processed within a required time.

An electronic device and an operating method of the electronic device according to one or more embodiments of the present disclosure may perform an operation of converting 2-channel audio into N-channel audio or converting N-channel audio to 2-channel audio (e.g., N=4) in a separate audio processing unit implemented on an application processor instead of a CPU.

Accordingly, the audio processing unit may receive the 2-channel audio stream from the CPU regardless of the device that outputs the audio stream. Accordingly, an electronic device and an operating method of the electronic device may not bring a delay time occurred by performing an operation of resetting an audio data path in accordance with a change in the number of channels of audio received from a CPU and an operation of changing the size of a buffer for the audio to be stored in temporarily because of a change in the size of audio transmitted from the CPU to the audio processing unit.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates a method of operating an electronic device according to one or more embodiments of the present disclosure.

DETAILED DESCRIPTION

Figure 1:
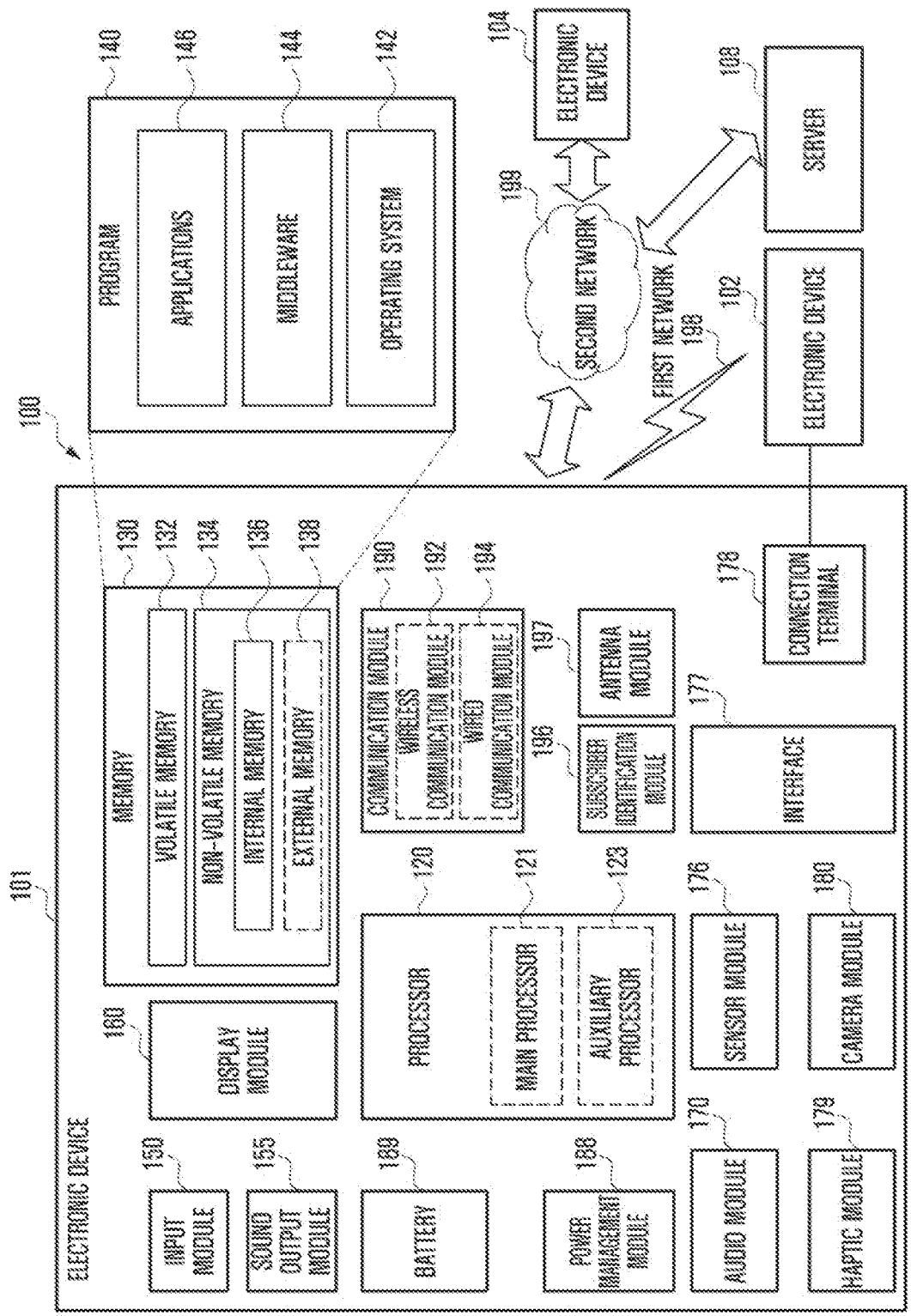
FIG. 1 illustrates an electronic device according to one or more embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108 For example, if the electronic device 101 should perform a function or a service automatically, or in response to a request from a user or another device, the electronic device 101, instead of, or in addition to, executing the function or the service , may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
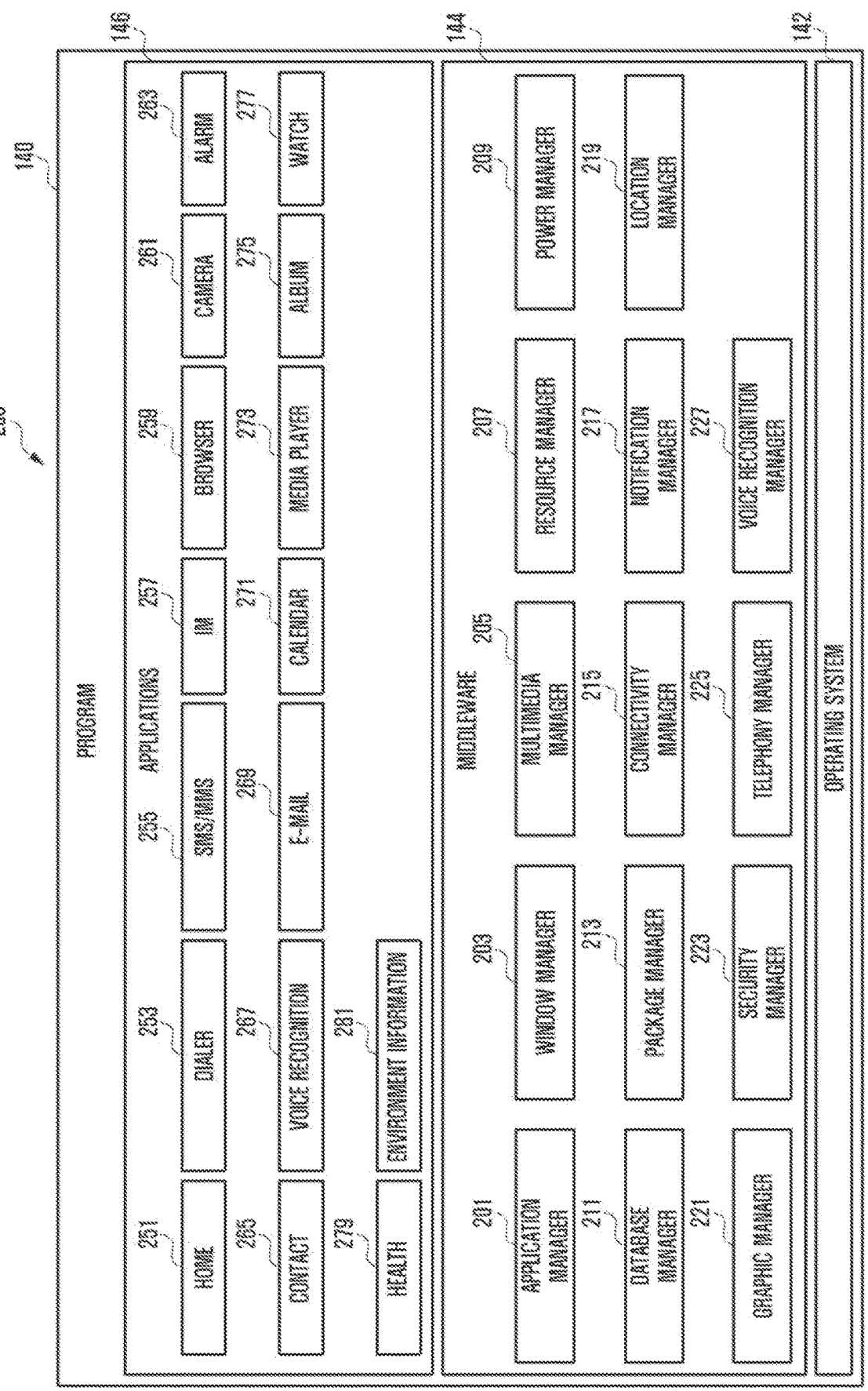
FIG. 2 illustrates a program according to one or more embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
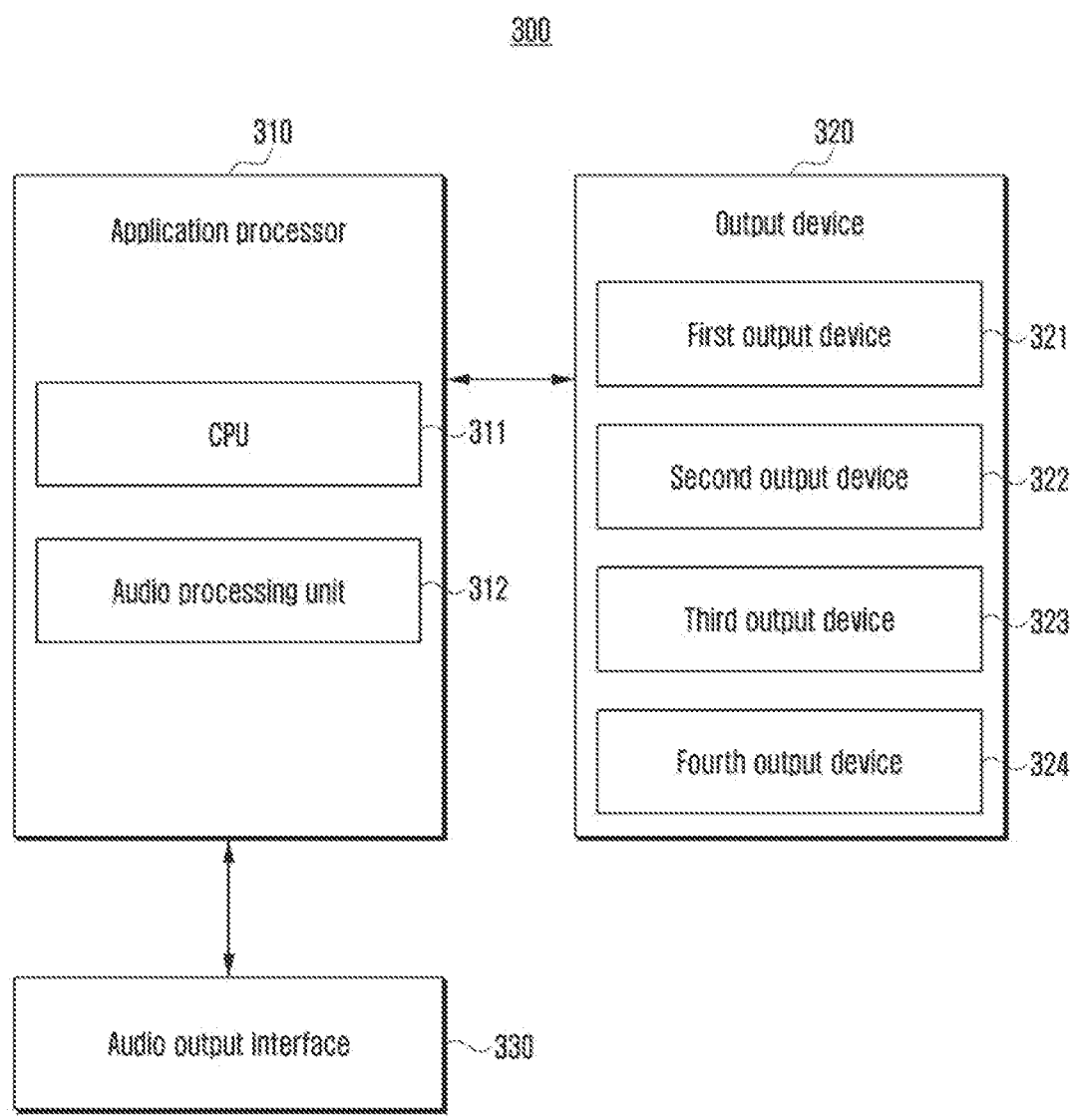
FIG. 3 illustrates an electronic device according to one or more embodiments of the present disclosure.

FIG. 3 is a block diagram of an electronic device according to one or more embodiments of the present disclosure. An electronic device (e.g., the electronic device 101 of FIG. 1) according to one or more embodiments of the present disclosure may include an application processor (e.g., the processor 120 of FIG. 1) 310, an output device (e.g., sound output module 155 of FIG. 1) 320 and/or an audio output interface 330 (e.g., the interface 177 of FIG. 1) .

According to one or more embodiments of the present disclosure, the output device 320 may output audio data transmitted by the application processor 310. The output device 320 may be implemented as a plurality of output devices in accordance with the maximum number of channels supported by the output device 320. For example, the output device 320 may include a first output device 321, a second output device 322, a third output device 323, and/or a fourth output device 324 to output 4-channel audio.

According to one or more embodiments of the present disclosure, the audio output interface 330 may be an interface for transmitting or receiving audio data between an external electronic device (e.g., the electronic device 102 of FIG. 1) and the electronic device 101. The audio output interface 330 may be implemented in various ways according to a connection method (e.g., a connection method through short-range wireless communication or a wired connection method) between the external electronic device 102 and the electronic device 101.

The electronic device 300 may be electrically connected to the external electronic device 102 through an audio output interface 330 implemented in various ways (e.g., a Peripheral Component Interconnect Express (PCIE) interface, a lightning interface, or a USB interface). The external electronic device 102 may be a device that outputs sound corresponding to audio stored in the electronic device 300. The external electronic device 102 may include a speaker for outputting audio stored in the electronic device 300. The external electronic device 102 may include a plurality of speakers in accordance with the maximum number of channels that the external electronic device 101 can support. For example, the external electronic device 102 may include two speakers to output 2-channel audio.

According to one or more embodiments of the present disclosure, the application processor 310 may include a CPU 311 (e.g., the main processor 121 of FIG. 1) that processes various processes executed on the electronic device 101 and an audio processing unit 312 (e.g., the auxiliary processor 123 of FIG. 1) that processes the processes related to audio output. The application processor 310 may be a System-on-Chip (SoC).

According to one or more embodiments of the present disclosure, the audio processing unit 312 may process various processes for audio data received from the CPU 311. For example, the audio processing unit 312 may include a Digital Signal Processor (DSP) (e.g., the auxiliary processor 123 of FIG. 1), a memory (e.g., the memory 130 of FIG. 1), an Analog to Digital Converter (ADC), and/or a Digital to Analog Converter (DAC). For example, the audio processing unit 312 may apply various sound effects to audio data. The audio processing unit 312 may perform various operations for outputting audio data to the audio output interface 330.

According to one or more embodiments of the present disclosure, the CPU 311 may detect the connection of the external electronic device 102 capable of outputting audio of a different channel (e.g., the 2 channels) from the maximum number of channels (e.g., the 4 channels) supported by the audio output interface 330 in a situation where the CPU 311 outputs N-channel audio through the audio output interface 330. According to an embodiment, the external electronic device 102 may be connected to the electronic device 101 through an audio output interface 330 implemented as a USB interface, and the CPU 311 may detect the connection of the external electronic device 102 through the audio output interface 330.

According to another embodiment, the external electronic device 102 may be connected to the electronic device 101 through an audio output interface 330 implemented on a short-range wireless communication (e.g., Bluetooth or Wi-Fi) module, and CPU 311 may detect the connection of the external electronic device 102 through the audio output interface 330.

According to one or more embodiments of the present disclosure, the CPU 311 may switch from a state of outputting audio through the output device 320 to a state of outputting audio through the external electronic device 102 in response to connection of the external electronic device 102 or a user input for outputting audio to the external electronic device 102. The audio processing unit 312, in order to output audio through the external electronic device 102, may perform an operation of releasing a path between the audio processing unit 312 and the output device 320, an operation of creating a path between the audio processing unit 312 and the external electronic device 102, and/or an operation of resetting a port of the audio processing unit 312.

According to one or more embodiments of the present disclosure, the CPU 311 may identify information of the external electronic device 102 according to the connection of the external electronic device 102. Information of the external electronic device 102 may include the maximum number of audio channels that the external electronic device 102 can support.

The maximum number of audio channels that the output device 320 can support may differ from the number of audio channels stored in the electronic device 300. In this case, the electronic device 300 needs to modify the audio data to have the maximum number of audio channels that the output device 320 can support. For example, the electronic device 300 may perform an operation of changing 2-channel audio into 4-channel audio in order to output 2-channel audio through the output device 320 capable of supporting 4-channel audio output.

There may be a case where the maximum number of audio channels that the external electronic device 102 can support is different from the number of audio channels currently being output (or the maximum number of audio channels that the output device 320 can support). In this case, the electronic device 300 needs to modify audio data so that the external electronic device 102 may have the maximum number of audio channels that the external electronic device 102 can support. For example, the electronic device 300 may perform an operation of changing (or converting) 4-channel audio to 2-channel audio in response to the connection of the external electronic device 320 capable of outputting 2-channel audio while outputting 4-channel audio through the output device 320.

An operation of changing the number of audio channels may be performed by the CPU 311 or the audio processing unit 312. In the case that the CPU 311 performs an operation of changing the number of audio channels, the CPU 311 may take a high load because of the operation of changing the number of audio channels and there may occur circumstances where various processing operations including audio output may not be processed within the required time.

In addition, the external electronic device 102 supporting the number of channels different from the number of audio channels currently being output (or the maximum number of audio channels that the output device 320 can support) may be connected to the electronic device 300. The audio processing unit 312, in the case of performing an operation of changing the number of audio channels in the CPU 311, may increase the delay time of audio output because of an operation of resetting an audio data path in accordance with the change in the number of channels and an operation of changing the size of the buffer for the audio to be stored in temporarily because of a change in the size (e.g., in case of receiving 2-channel audio in a situation where 4-channel audio is received, the size of the audio may be reduced by ½) of audio transmitted from the CPU 311 to the audio processing unit 312.

Hereinafter, to solve the problems described above, an embodiment in which the audio processing unit 312 performs an operation of changing the number of audio channels to be output will be described.

Figure 4:
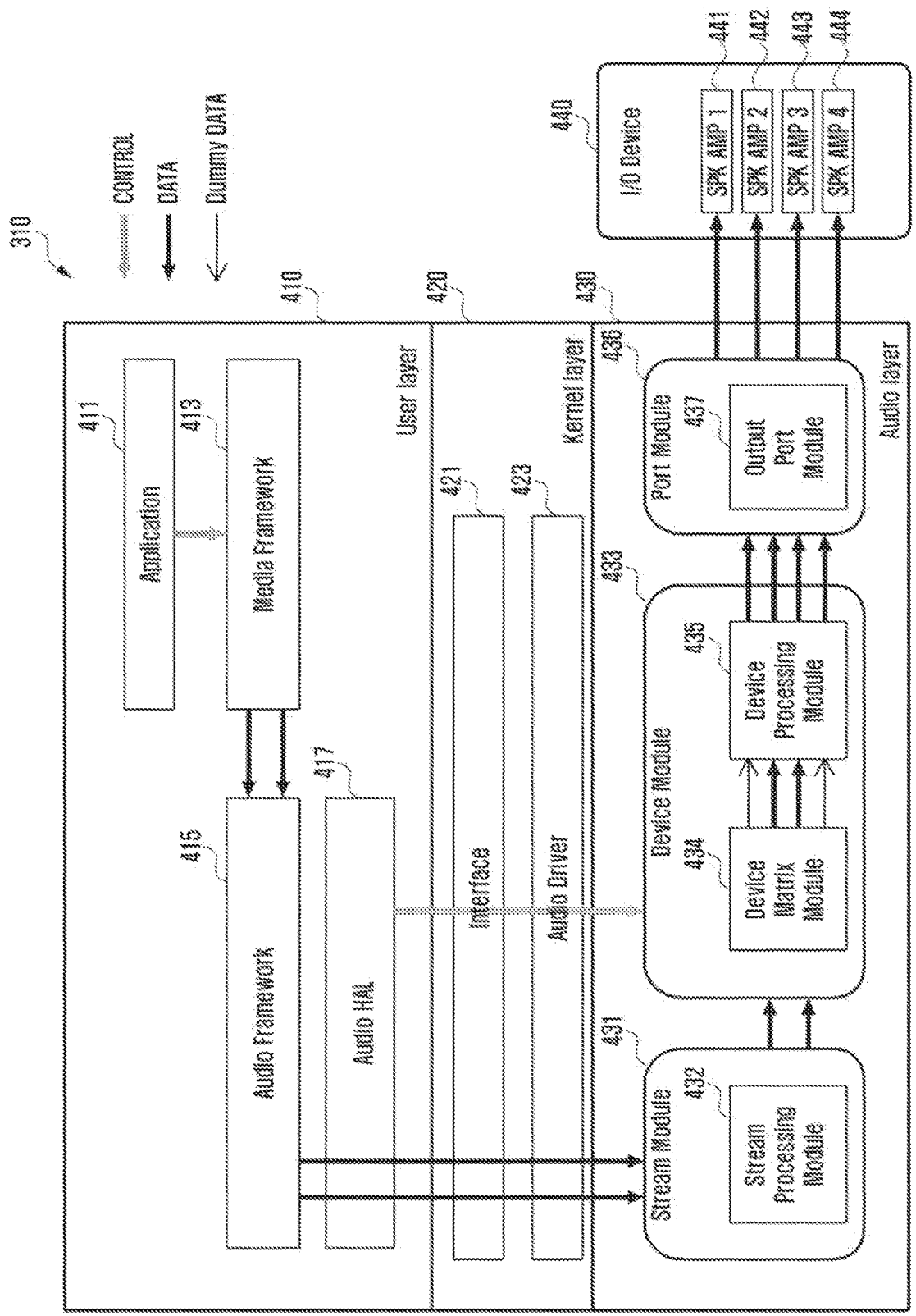
FIG. 4 illustrates an embodiment of processing an audio stream and transmitting the audio stream to an output device in an electronic device according to one or more embodiments of the present disclosure.

FIG. 4 is a diagram illustrating a software layer of an electronic device according to one or more embodiments of the present disclosure. In FIG. 4, an application processor (e.g., the application processor 310 of FIG. 3) ma-y load and execute a program 140 including a user layer 410, a kernel layer 420, and/or an audio layer 430 in the memory (e.g., the memory 130 of FIG. 1 or the volatile memory 132 of FIG. 1). The user layer 410 and the kernel layer 420 may be executed in a CPU (e.g., the CPU 311 of FIG. 3), and the audio layer 430 may be executed and/or implemented in an audio processing unit (e.g., the audio processing unit 312 of FIG. 3).

For example, the user layer 410, the kernel layer 420, and/or the audio layer 430 may be loaded into memory address spaces designated in the memories 130 and 132 respectively. According to one or more embodiments of the present disclosure, the audio stream data generated (or loaded) in the memory space of the user layer 410 and the kernel layer 420 by the CPU (e.g., the CPU 311 of FIG. 3) may be moved (e.g., copied) to a memory space of the audio layer 430 in accordance with Direct Memory Access (DMA) method (e.g., in accordance with the control of the DMA controller included in the application processor 310).

According to one or more embodiments of the present disclosure, audio stream data generated (or loaded) by a CPU (e.g., the CPU 311 of FIG. 3) may be moved (e.g., copied) to the memory space of the audio layer 430 in accordance with various communication methods (e.g., the shared memory Inter Process Communication (IPC) method) through the shared memory allocated to the memories 130 and 132. According to one or more embodiments of the present disclosure, the CPU 311 or the user layer 410 may include an application 411 (e.g., the media player 273 of FIG. 2), a media framework (e.g., the multimedia manager 205 of FIG. 2) 413, an audio framework 415 (e.g., the multimedia manager 205 of FIG. 2) and/or an audio hardware abstraction layer 417 (e.g., the multimedia manager 205 of FIG. 2).

According to one or more embodiments of the present disclosure, the CPU 311 or the application 411 may mean an application (e.g., the audio reproduction application or the media reproduction application) controlling a function (a function to activate audio reproduction, a function to disable audio reproduction, a volume control during audio reproduction, an audio equalizer function or audio reproduction control function). The application 411 may provide a user interface that allows a user to control functions related to audio reproduction.

According to one or more embodiments of the present disclosure, the CPU 311 or the media framework 413 may provide an Application Programming Interface (API) related to audio reproduction reproduced by the application 411. The CPU 311 or the media framework 413 may convert audio data to be reproduced into a format (e.g., the Pulse Code Modulation (PCM) data format) that can be provided to an audio layer using a decoding method. Audio to be reproduced may be audio data having 2 channels. Audio data having 2 channels may be implemented as different audio data in accordance with each channel.

According to one or more embodiments of the present disclosure, the CPU 311 or the media framework 413 may transmit information of audio data (e.g., the sampling rate of audio data, the number of channels, and the bit-width of audio data) to the audio framework 415.

According to one or more embodiments of the present disclosure, the CPU 311 or the audio framework 415 may provide the functions that a component of the electronic device 300 (e.g., the output device 320 of FIG. 3), through which the application 411 can output audio, or the external electronic device 102 may provide. The CPU 311 or the audio framework 415 may select a device to output audio from the output device 320 and/or the external electronic device 102. The selected device may be defined as a connected speaker device.

According to an embodiment, the CPU 311 or the audio framework 415 may select the output device 320 as a device to perform audio output in the case that an external electronic device 102 connected through audio output interface 330 does not exist.

According to one or more embodiments of the present disclosure, the CPU 311 or the audio framework 415 may receive audio data transmitted by the media framework 413 and convert the received audio data into an audio stream. An audio stream may mean audio data classified in various ways. For example, the audio stream may mean audio data classified according to the size of a buffer required to process the audio stream. The buffer may include a buffer implemented on the stream module 431. For example, the audio stream may include an audio stream including audio provided by a media application requiring a buffer having a relatively large size, and an audio stream including audio (e.g., the notification sound, the ring-tone sound) provided by a notification application or a phone application requiring a buffer having a relatively small size. Audio streams may be classified according to output channels or output devices. According to an embodiment, the 2-channel audio stream may include a first audio stream output through a first channel (or the first output device 321) and a second audio stream output through a second channel (or the second output device 322).

According to one or more embodiments of the present disclosure, the CPU 311 or the audio hardware abstract layer 417 may manage an abstracted layer between hardware (e.g., the output device 320 of FIG. 3 or the external electronic device 102) and the application 411, the media framework 413 or the audio framework 415. The CPU 311 or the audio hardware abstraction layer 417 may receive information about the selected device transmitted by the audio framework 415, generate a control signal for controlling the selected device among the output device 320 and/or the external electronic device 102, and transmit the control signal to the audio driver 423.

According to one or more embodiments of the present disclosure, the CPU 311 or the audio hardware abstraction layer 417 may control the audio driver 423 on the basis of audio stream information (e.g., the audio stream sampling rate, the number of channels, the audio stream size) and information about the selected device.

According to one or more embodiments of the present disclosure, the CPU 311 or the kernel layer 420 may be the layer where the entities controlling audio output hardware (e.g., the output device 320 of FIG. 3 or the external electronic device 102) are implemented. The kernel layer 420 may include an audio driver 423 that controls hardware that outputs audio and an interface 421 that provides an interface between the audio hardware abstraction layer 417 and the audio driver 423.

According to one or more embodiments of the present disclosure, the CPU 311 or the audio driver 423 may receive a control signal transmitted by the audio hardware abstraction layer 417 and control the hardware (e.g., the output device 320 of FIG. 3 or the external electronic device 102) outputting audio based on the control signal.

According to one or more embodiments of the present disclosure, the audio layer 430 may process the audio stream generated by the user layer 410 as a software layer implemented in the audio processing unit 312, and it may perform various operations to output the audio stream to the output device 320. The audio processing unit 312 or the audio layer 430 may include a stream module 431, a device module 433 and/or a port module 436.

According to one or more embodiments of the present disclosure, the audio processing unit 312 or the stream module 431 may receive an audio stream and a control signal transmitted from the audio hardware abstraction layer 417 of the user layer 410, and it may process the audio stream based on the control signal. The stream processing module 432 included in the stream module 431 or the audio processing unit 312 may receive a control signal requesting audio reproduction, apply various effects on the received audio stream (e.g., the sound field effect), and transmit the processed audio stream to the device module 433.

The audio processing unit 312 or the stream processing module 432 may process the audio stream by an audio stream unit. The audio processing unit 312 or the stream processing module 432 may include a buffer in order to process the audio stream. The audio processing unit 312 or the stream processing module 432 may transmit audio data of 2 channels to the device module 433.

According to one or more embodiments of the present disclosure, the audio processing unit 312 or the device module 433 may include a device matrix module 434 that performs an operation of designating an output device to output the audio stream transmitted by the stream module 431. The device module 433 may include a device processing module 435 that performs post-processing of the audio stream.

According to one or more embodiments of the present disclosure, the audio processing unit 312 or the device matrix module 434 may perform an operation of designating the output device (e.g., the output device 320 or the external electronic device 102) to output the audio stream transmitted by the stream module 431. The audio processing unit 312 or the device matrix module 434 may receive information about a device to output an audio stream from the audio hardware abstraction layer 417.

According to one or more embodiments of the present disclosure, the audio processing unit 312 or the device module 433 may receive information about an output device to output an audio stream and determine whether to convert a 2-channel audio stream into N-channel audio stream based on the information about the output device.

According to an embodiment, the audio processing unit 312 or the device module 433 may receive information about a device (e.g., the output device 320) to output an audio stream and determine the maximum number of channels that the output device 320 can support on the basis of the information about the device to output an audio stream.

According to one or more embodiments of the present disclosure, the audio processing unit 312 or the device module 433 may determine converting the 2-channel audio stream into the N-channel audio stream in response to the identification that the maximum number of channels (e.g., N channels, such as four (4) channels) that the output device 320 can support is different from the number of audio streams (e.g., 2 channels). Hereinafter, an embodiment of converting a 2-channel audio stream into an N-channel audio stream will be described.

According to one or more embodiments of the present disclosure, the audio processing unit 312 or the device matrix module 434 may generate N−2 dummy data and transmit N−2 dummy data to the device processing module 425 together with the 2-channel audio stream. Dummy data may be silent data as the data that does not include audio to be output.

According to one or more embodiments of the present disclosure, the audio processing unit 312 or the device matrix module 434 may determine the number of dummy data to be generated based on information of the output device 320 to output the audio stream. The audio processing unit 312 or the device matrix module 434 may identify that the output device 320 supports output of up to N-channel audio streams and it may determine to generate N−2 dummy data.

According to one or more embodiments of the present disclosure, the audio processing unit 312 or the device matrix module 434 may designate channels to which N−2 dummy data and 2-channel audio streams are to be output. For example, the audio processing unit 312 or the device matrix module 434 may designate the first audio stream as a first channel so that the first audio stream can be output to the first output device 321, designate the second audio stream as a second channel so that the second audio stream can be output to the second output device 322, designate the first dummy data among N−2 dummy data as a third channel so that the first dummy data can be output to the third output device 323, and designate the second dummy data among N−2 dummy data as a fourth channel so that the second dummy data can be output to the fourth output device 324.

According to one or more embodiments of the present disclosure, the audio processing unit 312 or the device matrix module 434 may designate channels differently to which N−2 dummy data and 2-channel audio streams are output on the basis of the state information (e.g., the position information of the electronic device 300) received from the user layer 410. For example, in response to identifying that the electronic device 300 is in a landscape mode, the audio processing unit 312 or the device matrix module 434 may designate the first audio stream as the first channel so that the first audio stream can be output to the first output device 321, may designate the second audio stream as the second channel so that the second audio stream can be output to the second output device 322, may designate the first dummy data among N−2 dummy data as the third channel so that the first dummy data can be output to the third output device 323, and may designate the second dummy data among the N−2 dummy data as the fourth channel so that the second dummy data can be output to the fourth output device 324.

In response to identifying that the electronic device 300 is in a portrait mode, the audio processing unit 312 or the device matrix module 434 may designate the first audio stream as the second channel so that the first audio stream can be output to the second output device 322, may designate the second audio stream as the fourth channel so that the second audio stream can be output to the fourth output device 324, may designate the first dummy data among N−2 dummy data as the first channel so that the first dummy data can be output to the first output device 321, and may designate the second dummy data among N−2 dummy data as the third channel so that the second dummy data can be output to the third output device 323.

According to one or more embodiments of the present disclosure, the audio processing unit 312 or the device processing module 425 may convert N−2 dummy data into N−2 audio streams in a method of copying one audio stream among 2-channel audio streams to one dummy data among N−2 dummy data. The audio processing unit 312 or the device processing module 425 may covert the dummy data to audio stream in a method of accessing an area of memory (e.g., the memory 130 of FIG. 1) corresponding to the 2-channel audio streams and copying one stream of the 2-channel audio streams to an area of the memory 130 corresponding to the dummy data in the area of the accessed memory 130.

According to one or more embodiments of the present disclosure, the audio processing unit 312 or the device processing module 425 may identify a port of an output device to which first dummy data included in N−2 dummy data is to be output. The device processing module 425 may convert the first dummy data into an audio stream by identifying an audio stream to be output to a port of an output device to which the first dummy data is to be output, and copying the identified audio stream.

For example, where the first dummy data and the first audio stream are output through a speaker (e.g., the first output device 321 or the second output device 322) disposed in a partial area (e.g., the right side of the electronic device 300) of the electronic device 300, the audio processing unit 312 or the device processing module 425 may convert the first dummy data into the audio stream by accessing an area of the memory 130 corresponding to the first audio stream, copying the stored in the accessed area, and putting the copied data in an area of the memory 130 corresponding to the first dummy data.

For example, where the second dummy data and the second audio stream are output through a speaker (e.g., the third output device 323 or the fourth output device 324) disposed in another partial area (e.g., the right side of the electronic device 300) of the electronic device 300, the audio processing unit 312 or the device processing module 425 may convert the second dummy data into the audio stream by accessing an area of the memory 130 corresponding to the second audio stream, copying the stored in the accessed area, and putting the copied data in an area of the memory 130 corresponding to the second dummy data.

According to one or more embodiments of the present disclosure, the audio processing unit 312 or the port module 436 may include an output port module 437 that allocates N audio streams transmitted by the device module 433 to N output ports. The N audio streams may be inputted to the first amplification module 441, the second amplification module 442, the third amplification module 443, and the fourth amplification module 444 implemented in the input/output device 440, and they may be converted and amplified into an analog signal from the digital signal. The N audio streams may be output through the output device 320 connected to the input/output device 440.

Figure 5:
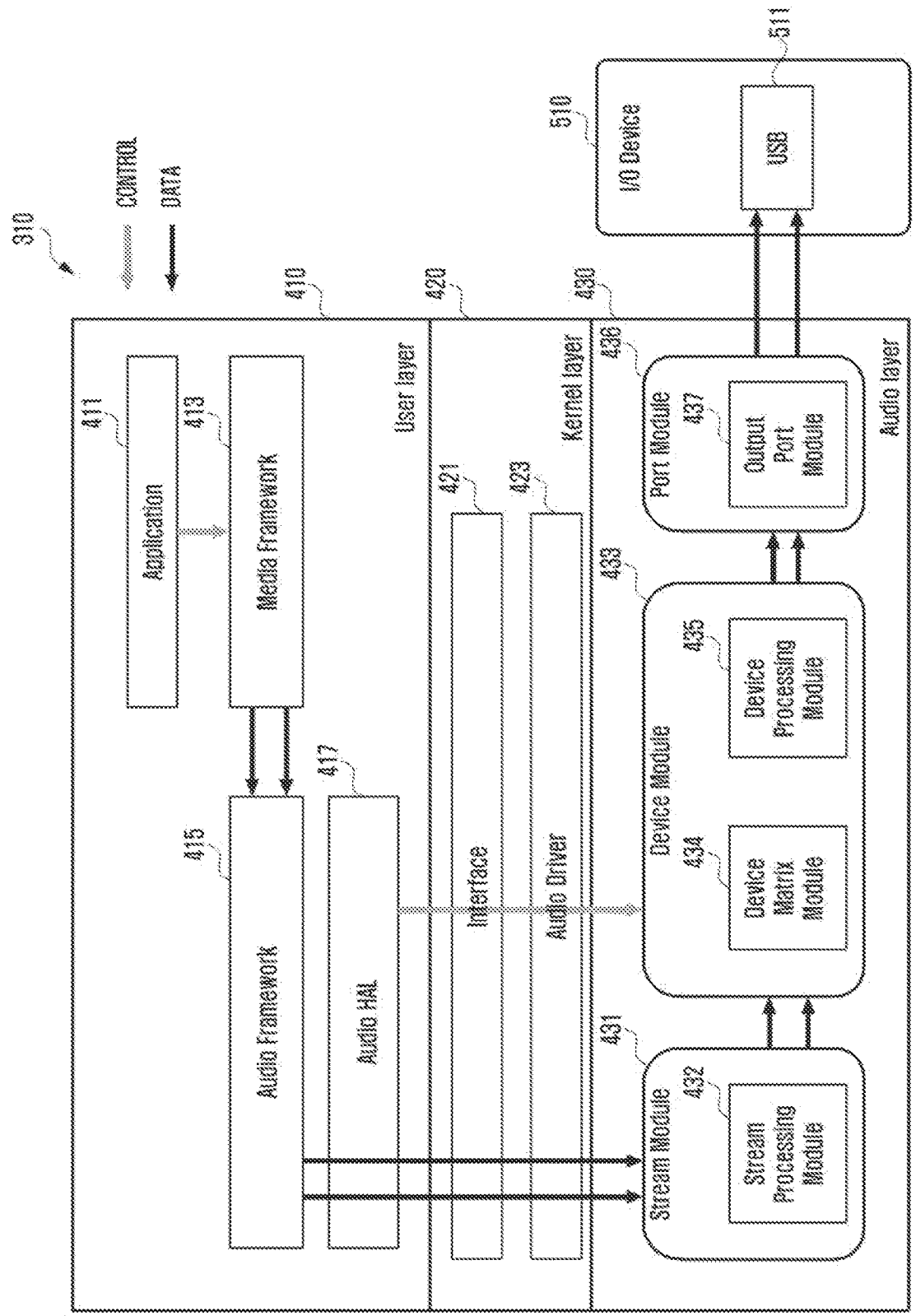
FIG. 5 illustrates an embodiment in which an electronic device processes an audio stream and transmits the audio stream to an external electronic device according to one or more embodiments of the present disclosure.

FIG. 5 is a diagram illustrating an embodiment in which an audio stream is transmitted from an electronic device to an external electronic device according to one or more embodiments of the present disclosure. An embodiment described in FIG. 5 relates to outputting an audio stream to the external electronic device 102 in accordance with the connection of the external electronic device (e.g., the external electronic device 102 of FIG. 1) in a state where the electronic device 300 converts a 2-channel audio stream into an N-channel audio stream and outputs the N-channel audio stream through the audio output interface 330. Descriptions of components identical to those shown in FIG. 4 are omitted.

According to one or more embodiments of the present disclosure, the electronic device 300 may detect the connection of the external electronic device 102 through an audio output interface (e.g., the audio output interface 330 of FIG. 3). The external electronic device 102 may include a speaker for outputting audio stored in the electronic device 300.

The external electronic device 102 may include a plurality of speakers in accordance with the maximum number of channels that the electronic device 101 can support. For example, the external electronic device 102 may include two speakers to output 2-channel audio. In FIG. 5, the external electronic device 102 can output audio of 2 channels, which are different from N channels (e.g., four (4) channels).

According to one or more embodiments of the present disclosure, where the CPU 311 outputs N-channel audio through the audio output interface 330, the CPU 311 may detect the connection of the external electronic device 102 capable of outputting audio of different channels (e.g., 2 channels) from the maximum number of channels supported by the audio output interface 330 (e.g., 4 channels).

According to an embodiment, the external electronic device 102 may be connected to the electronic device 101 through an audio output interface 330 implemented as a USB interface, and the CPU 311 may detect the connection of the external electronic device 102 through the audio output interface 330.

According to another embodiment, the external electronic device 102 may be connected to the electronic device 101 through an audio output interface 330 implemented on a short-range wireless communication (e.g., Bluetooth or Wi-Fi) module, and central processing unit 311 may detect the connection of the external electronic device 102 through the audio output interface 330.

According to one or more embodiments of the present disclosure, the audio framework 415 may switch from a state of outputting audio through the output device 320 to a state of outputting audio through the external electronic device 102 in response to connection of the external electronic device 102 or a user input for outputting audio to the external electronic device 102.

The audio hardware abstraction layer 417, in order to output audio through the external electronic device 102, may perform an operation of releasing a path between the audio processing unit 312 and the output device 320, an operation of creating a path between the audio processing unit 312 and the external electronic device 102, and/or an operation of controlling the output port module 437 to reset the port to enable the connection to the external electronic device 102.

According to one or more embodiments of the present disclosure, the audio framework 415 may identify information of the external electronic device 102 in accordance with the connection of the external electronic device 102. Information of the external electronic device 102 may include the maximum number of audio channels (e.g., 2 channels) that the external electronic device 102 can support. Alternatively, the information of the external electronic device 102 may include manufacturer information of the external electronic device 102 or identification information of the external electronic device 102.

According to one or more embodiments of the present disclosure, the device module 433 may receive information about a speaker device (e.g., the output device 320 or the external electronic device 102) to output an audio stream and determine whether to stop an operation of converting a 2-channel audio stream into an N-channel audio stream on the basis of information about the speaker device.

According to one or more embodiments of the present disclosure, a speaker device may output an audio stream stored in the electronic device 300. For example, the speaker device may be at least one of the output device 320 or the external electronic device 102. The device module 433 may determine whether to stop an operation of converting a 2-channel audio stream into an N-channel audio stream based on a connected speaker device. Information of the connected speaker device may mean information of the output device 320 or information of the external electronic device 102.

According to an embodiment, the device module 433 may identify information of the external electronic device 102, and it may stop an operation of converting the 2-channel audio stream into the N-channel audio stream in response to the identification that the maximum number of audio channels (e.g., 2 channels) that the external electronic device 102 can support is different from the maximum number of audio channels (e.g., N channels) that the output device 320 can support.

According to an embodiment, the device module 433 may identify information of the external electronic device 102 in a state of receiving 2-channel audio streams. The device module 433 may stop an operation of converting a 2-channel audio stream into an N-channel audio stream in response to the identification that the maximum number of audio channels (e.g., 2 channels) that the external electronic device 102 can support is equal to the number of channels of the audio stream.

According to one or more embodiments of the present disclosure, the device processing module 435 may switch a thread which performs an operation of converting into an N-channel audio stream, to an inactive state. Switching a thread, which performs an operation of converting a 2-channel audio stream into an N-channel audio stream, to an inactive state may mean that the device processing module 435 performs only sound effect processing without changing the number of channels in respect to the 2-channel audio stream transmitted by the stream module 431. Alternatively, the 2-channel audio stream transmitted by the stream module 431 is directly transmitted to the port module 436 without passing through the device module 433.

According to one or more embodiments of the present disclosure, the output port module 437 may transmit a 2-channel audio stream transmitted by the device module 433 or the stream module 431 to the USB port 511 of the input/output device 510.

Figure 6:
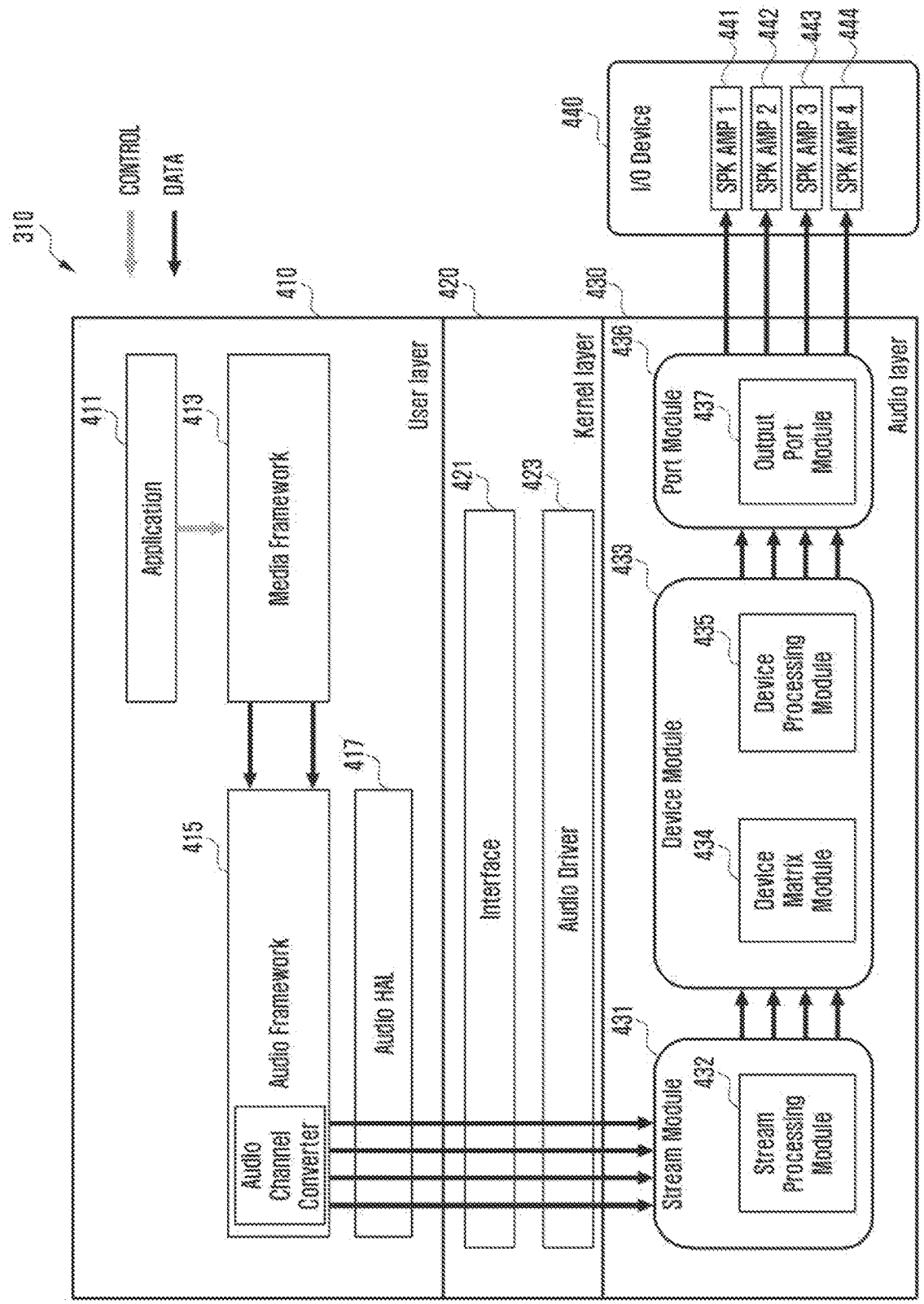
FIG. 6 illustrates a comparative example of processing an audio stream and transmitting the audio stream to an output device in an electronic device according to one or more embodiments of the present disclosure.

FIG. 6 is a diagram illustrating a comparative example of processing an audio stream and transmitting the audio stream to an output device in an electronic device according to one or more embodiments of the present disclosure. FIG. 6 is a diagram illustrating a comparative example of performing the operation of changing the number of audio channels to be output not in an audio processing unit (e.g., the audio processing unit 312 of FIG. 3), but in a CPU (e.g., the CPU 311 of FIG. 3). Descriptions of components identical to those shown in FIG. 4 are omitted.

According to the comparative example, the audio framework 415 may provide the functions that a component of the electronic device 300 (e.g., the output device 320 of FIG. 3)

or the external electronic device 300, through which an application can output audio, can support. The audio framework 415 may select a device to perform audio output among the output device 320 and/or the external electronic device 102. According to an embodiment, the audio framework 415 may select the output device 320 as a device for performing audio output in a case that the external electronic device 102 connected through the audio output interface 330 does not exist.

According to the comparative example, the audio framework 415 may receive information of a device (e.g., the output device 320) to output an audio stream, and the audio framework 415 may identify the maximum number of channels that the output device 320 can support on the basis of the information of the device to output the audio stream. The audio framework 415 may determine converting the 2-channel audio stream to N-channel audio stream in response to the identification that the number of channels (e.g., N channels) that the output device 320 can maximally support is different from the number of audio streams (e.g., 2 channels).

An operation of converting into an N-channel audio stream may be performed by the audio channel converter 610. The audio channel converter 610 may convert a 2-channel audio stream into an N-channel audio stream using various methods. The audio framework 415 may transmit an N-channel audio stream to the stream module 431 through the kernel layer 420. The stream module 431 may temporarily store an N-channel audio stream in a buffer and transmit it to the device module 433.

According to the comparative example, the electronic device 300 may detect an external electronic device (e.g., the external electronic device 102 of FIG. 1) being connected in a state where the electronic device 300 converts a 2-channel audio stream into an N-channel audio stream and outputs the N-channel audio stream through the audio output interface 330.

According to the comparative example, the electronic device 300 may detect the connection of the external electronic device 102 through an audio output interface (e.g., the audio output interface 330 of FIG. 3). The external electronic device 102 may include a speaker for outputting audio stored in the electronic device 300. The external electronic device 102 may include a plurality of speakers in accordance with the maximum number of channels that the external electronic device 101 can support. For example, the external electronic device 102 may include two speakers to output 2-channel audio.

According to the comparative example, the audio framework 415 may switch from a state of outputting audio through the output device 320 to a state of outputting audio through the external electronic device 102 in response to connection of the external electronic device 102 or a user input for outputting audio to the external electronic device 102. The audio hardware abstraction layer 417, in order to output audio through the external electronic device 102, may perform an operation of releasing a path between the audio processing unit 312 and the output device 320, an operation of creating a path between the audio processing unit 312 and the external electronic device 102, and/or an operation of controlling the output port module 437 to reset the port to enable the connection to the external electronic device 102.

According to the comparative example, the audio framework 415 may identify information of the external electronic device 102 according to the connection of the external electronic device 102. Information of the external electronic device 102 may include the maximum number of audio channels (e.g., 2 channels) that the external electronic device 102 can support. Alternatively, the information of the external electronic device 102 may include manufacturer information of the external electronic device 102 or identification information of the external electronic device 102.

According to the comparative example, the audio channel converter 610 may identify the information of the external electronic device 102. The audio channel converter 610 may stop an operation of converting the 2-channel audio stream into the N-channel audio stream in response to the identification that the maximum number of audio channels (e.g., 2 channels) that the external electronic device 102 can support is different from the maximum number of audio channels (e.g., N channels) that the output device 320 can support.

According to the comparative example, the audio framework 415 may transmit 2-channel audio streams to the stream module 431 through the kernel layer 420. The stream module 431 may receive 2-channel audio streams after performing an operation of reducing the size of a buffer in which N-channel audio streams are temporarily stored. Components of the audio layer 430 may output 2-channel audio stream to the external electronic device 102 after performing at least one of operations (e.g., the operation of releasing a path between the audio processing unit 312 and the output device 320, the operation of creating a path between the audio processing unit 312 and the external electronic device 102 and/or the operation of resetting a port of the audio processing unit 312) that resets a path through which an audio stream is transmitted.

An embodiment described in FIGS. 4 and 5 is an embodiment in which the audio processing unit 312, not the CPU 311, performs an operation of converting a 2-channel audio stream into an N-channel audio stream or converting an N-channel audio stream to a 2-channel audio stream. In a case that the CPU 311 processes an operation of converting a 2-channel audio stream into an N-channel audio stream, performing the operation of resetting the audio data path in accordance with the change in the number of channels and the operation of changing the size of the buffer for the audio to be stored in temporarily because of a change in the size (e.g., in a case of receiving 2-channel audio in a situation where 4-channel audio is received, the size of the audio may be reduced by ½) of audio transmitted from the CPU 311 to the audio processing unit 312, may bring a delay time of audio output in outputting audio stream to the external electronic device in the output device. In a case of an embodiment in which the audio processing unit 312 processes an operation of converting a 2-channel audio stream into an N-channel audio stream or converting an N-channel audio stream to a 2-channel audio stream, the audio processing unit 312 may receive 2-channel audio stream from the CPU 311 regardless of which device outputs an audio stream. Therefore, the electronic device 300 according to one or more embodiments of the present disclosure may not bring a delay time occurred by performing an operation of resetting an audio data path in accordance with a change in the number of channels and an operation of changing the size of a buffer for the audio to be stored in temporarily because of a change in the size of audio transmitted from the CPU 311 to the audio processing unit 312.

In FIGS. 3 to 6, an embodiment of converting a 2-channel audio stream into an N-channel audio stream has been described, but the present disclosure is not limited to the 2-channel audio stream. The electronic device 300 according to one or more embodiments of the present disclosure may convert an M-channel audio stream into an N-channel audio stream instead of a 2-channel audio stream.

According to one or more embodiments of the present disclosure, the electronic device 300 may store the M-channel audio stream in a memory (e.g., the memory 130 of FIG. 1). The audio processing unit 312 of the electronic device 300 may receive the M-channel audio stream from the CPU 311 and convert the M-channel audio stream into an N-channel audio stream.

If N is greater than M, the audio processing unit 312 may generate the N−M dummy data. The audio processing unit 312 may generate an audio stream of N−M channel by copying N−M dummy data to an audio stream of M channel, and it may generate an audio stream of the N channel by using the audio stream of M channel and the audio stream of N−M channel. When M is greater than N, the audio processing unit 312 may generate N-channel audio streams by deleting M−N audio streams from M-channel audio streams.

An electronic device according to one or more embodiments of the present disclosure may comprise: an output device for outputting audio by using N channels; an audio output interface connectable to an external electronic device for outputting an audio by using channels differing in number from the output device; and an Application Processor (AP) including a CPU and an audio processing unit for processing audio, wherein the audio processing unit can be configured to receive an M-channel audio stream from the CPU, convert the M-channel audio stream into an N-channel audio stream, output the N-channel audio stream through the output device, detect a connection to the external electronic device through the audio output interface, determine, on the basis of the information about a connected speaker device, whether to stop an N-channel audio stream conversion operation received from the CPU, and transmit the M-channel audio stream to the external electronic device in response to the stopping of the N-channel audio stream conversion operation.

In the electronic device according to one or more embodiments of the present disclosure, the audio processing unit may be configured to determine the number of audio channels supported by the external electronic device based on information of the external electronic device.

In the electronic device according to one or more embodiments of the present disclosure, the audio processing unit may be configured to stop converting the N-channel audio stream in response to the identification that the number of audio channels supported by the external electronic device is not N channels.

In the electronic device according to one or more embodiments of the present disclosure, the audio processing unit may be configured to stop generating the N-channel audio stream in response to the number of audio channels supported by the external electronic device being 2 channels.

In the electronic device according to one or more embodiments of the present disclosure, the audio processing unit may be configured to generate the N−M dummy data, generate audio streams of the N−M channels by copying the N−M dummy data to the audio stream of the M channels, and convert the N-channel audio stream on the basis of the M-channel audio stream and the N−M channel audio stream.

In the electronic device according to one or more embodiments of the present disclosure, the audio processing unit may be configured to identify a channel to which the first dummy data included in the N−M dummy data is to be output, select an audio stream to be copied among M channel audio streams on the basis of the identified channel, and convert the first dummy data into the audio stream by copying the selected audio stream.

In the electronic device according to one or more embodiments of the present disclosure, the audio processing unit may be configured to determine the number of audio channels supported by the external electronic device on the basis of the information of the external electronic device and determine the number of dummy data to be generated on the basis of the identified number of channels.

In the electronic device according to one or more embodiments of the present disclosure, the audio processing unit may be configured to receive state information of the electronic device from the CPU and generate the N-channel audio stream based on the state information of the electronic device.

In the electronic device according to one or more embodiments of the present disclosure, the audio processing unit may be configured to perform at least one action to generate the N-channel audio stream based on the information of the output device in response to the identification that the external electronic device is disconnected.

In an electronic device according to one or more embodiments of the present disclosure, the output device may output 4-channel audio, and information of the speaker device may include information of at least one of the external electronic device and the output device.

Figure 7:
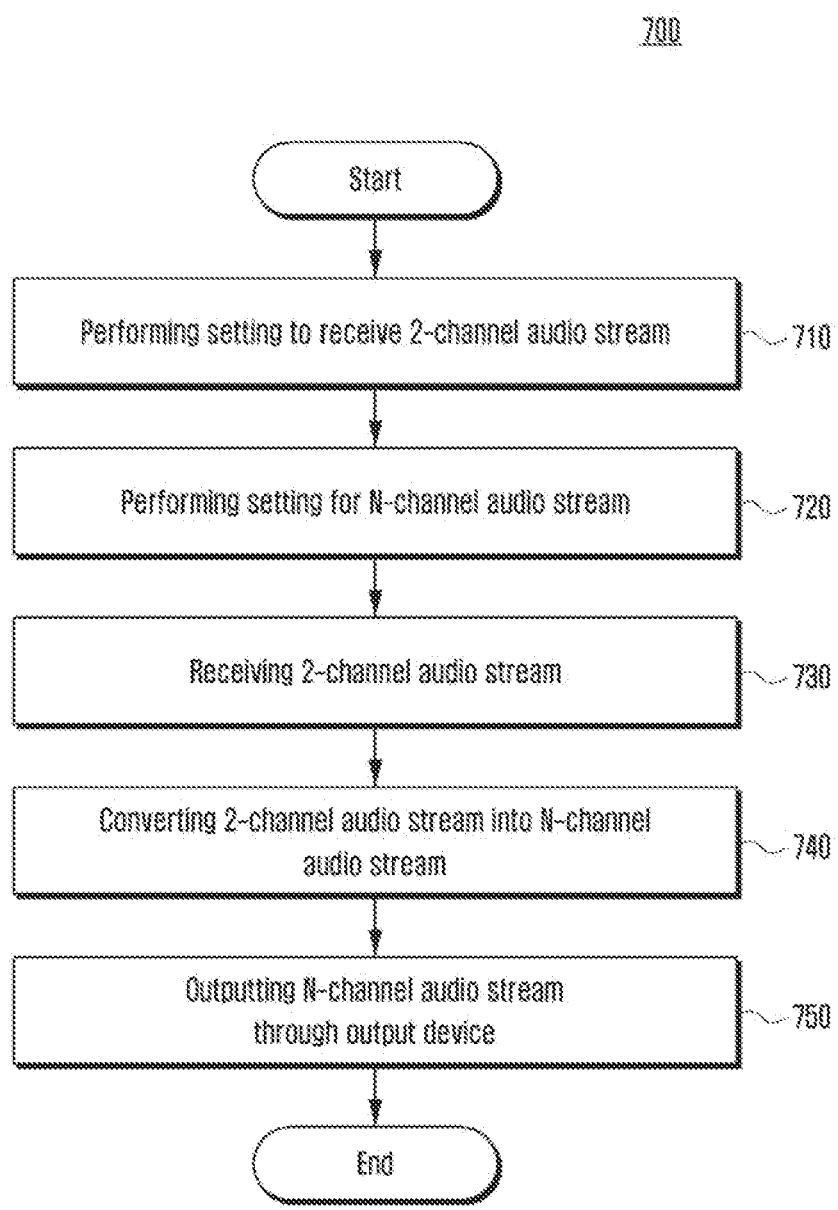
FIG. 7 illustrates a method of operating an electronic device according to one or more embodiments of the present disclosure.

FIG. 7 is an operation flowchart illustrating an operating method 700 of an electronic device according to one or more embodiments of the present disclosure. According to one or more embodiments of the present disclosure, in operation 710, an audio processing unit (e.g., the audio processing unit 312 of FIG. 3) of an electronic device (e.g., the electronic device 300 of FIG. 3) may perform a setting for receiving a 2-channel audio stream.

According to one or more embodiments of the present disclosure, the setting for receiving a 2-channel audio stream may include an operation of controlling the stream module 431 so that the audio processing unit 312 may activate the buffer for the stream module (e.g., the stream module 431 of FIG. 4) to receive a 2-channel audio stream from the user layer (e.g., the user layer 410 of FIG. 4).

According to one or more embodiments of the present disclosure, in operation 720, the audio processing unit 312 may perform a setting for N-channel audio stream conversion.

According to one or more embodiments of the present disclosure, the setting for N-channel audio stream conversion may include an operation of controlling the device matrix module 434 to generate N−2 dummy data and/or an operation of activating a thread performing N-channel audio stream conversion on the device processing unit (e.g., the device processing module 435).

According to one or more embodiments of the present disclosure, the audio processing unit 312 may determine the number of dummy data to be generated based on information of the output device 320 to output the audio stream. The audio processing unit 312 may identify that the output device 320 supports outputting an audio stream of up to N channels and control the device matrix module 434 to generate N−2 dummy data. Dummy data may be silent data as the data that does not include audio to be output.

According to one or more embodiments of the present disclosure, in operation 730, the audio processing unit 312 may receive a 2-channel audio stream from the CPU (e.g., the CPU 311 of FIG. 3).

According to one or more embodiments of the present disclosure, in operation 740, the audio processing unit 312 may convert a 2-channel audio stream into an N-channel audio stream.

According to one or more embodiments of the present disclosure, the audio processing unit 312 may convert N−2 dummy data into N−2 audio streams in a method of copying one audio stream among 2-channel audio streams to one dummy data among N−2 dummy data. The audio processing unit 312 may covert the dummy data to audio stream in a method of accessing an area of memory corresponding to the 2-channel audio streams and copying one stream of the 2-channel audio streams to an area of the memory corresponding to the dummy data in the area of the accessed memory 130.

According to one or more embodiments of the present disclosure, in operation 750, the audio processing unit 312 may output an N-channel audio stream through the output device 320.

FIG. 8 is an operation flowchart illustrating an operating method 800 of an electronic device according to one or more embodiments of the present disclosure. According to one or more embodiments of the present disclosure, in operation 810, the audio processing unit (e.g., the audio processing unit 312 of FIG. 3) may detect the connection of an external electronic device (e.g., the external electronic device 102 of FIG. 1).

According to one or more embodiments of the present disclosure, the audio processing unit 312 may detect the connection of the external electronic device 102 on the basis of the information of the external electronic device 102 transmitted by the CPU 311. The external electronic device 102 may be a device that outputs sound corresponding to audio stored in the electronic device 300. The external electronic device 102 may include a speaker for outputting audio stored in the electronic device 300. The external electronic device 102 may include a plurality of speakers in accordance with the maximum number of channels that the external electronic device 101 can support. For example, the external electronic device 102 may include two speakers to output 2-channel audio. Information of the external electronic device 102 may include the maximum number of audio channels (e.g., 2 channels) that the external electronic device 102 can support. Alternatively, the information of the external electronic device 102 may include the manufacturer information of the external electronic device 102 (e.g., a vendor's identification (ID)) or identification information of the external electronic device 102 (e.g., a product's ID).

According to one or more embodiments of the present disclosure, in operation 820, the audio processing unit 312 may determine whether to stop converting an N-channel audio stream based on information of a connected speaker device.

According to one or more embodiments of the present disclosure, a connected speaker device may mean a device that outputs an audio stream stored in the electronic device 300. For example, the connected speaker device may mean at least one of the output device 320 and the external electronic device 102. Information of the connected speaker device may mean information of the output device 320 or information of the external electronic device 102.

According to an embodiment, the audio processing unit 312 may identify information of the external electronic device 102, and it may stop an operation of converting the 2-channel audio stream into the N-channel audio stream in response to the identification that the maximum number of audio channels (e.g., 2 channels) (that the external electronic device 102 can support) is different from the maximum number of audio channels (e.g., N channels) that the output device 320 can support.

According to an embodiment, the audio processing unit 312 may identify information of the external electronic device 102 in a state of receiving 2-channel audio streams, and it may stop an operation of converting a 2-channel audio stream into an N-channel audio stream in response to the identification that the maximum number of audio channels (e.g., 2 channels) that the external electronic device 102 can support is equal to the number of channels of the audio stream.

According to one or more embodiments of the present disclosure, in operation 830, the audio processing unit 312 may stop converting an N-channel audio stream. According to one or more embodiments of the present disclosure, the audio processing unit 312 may switch a thread, which performs an operation of converting into an N-channel audio stream, to an inactive state. Switching a thread, which performs an operation of converting a 2-channel audio stream into an N-channel audio stream, to an inactive state may mean that the device processing module 435 performs only sound effect processing without changing the number of channels in respect to the 2-channel audio stream transmitted by the stream module 431. Alternatively, it may mean that the 2-channel audio stream transmitted by the stream module 431 is directly transmitted to the port module 436 without passing through the device module 433.

According to one or more embodiments of the present disclosure, in operation 840, the audio processing unit 312 may perform a connection between the external electronic device 102 and the audio processing unit 312. According to one or more embodiments of the present disclosure, the audio processing unit 312 may release the path generated between the output device 320 and the audio processing unit 312, and it may generate a path between the external electronic device 102 and the audio processing unit 312 so that an audio stream is transmitted.

According to one or more embodiments of the present disclosure, in operation 850, the audio processing unit 312 may output a 2-channel audio stream through the external electronic device 102. The method of operating an electronic device according to one or more embodiments of the present disclosure may include: an operation that an audio processing unit receives an M-channel audio stream from a CPU; an operation that the audio processing unit converts the M-channel audio stream into an N-channel audio stream; an operation that the audio processing unit outputs the N-channel audio stream to an output device supporting N-channel audio output; an operation that the audio processing unit determines whether to stop converting the N-channel audio stream on the basis of speaker device information received from the CPU in response to connection of an external electronic device supporting audio output of a different number of channels from the output device; and an operation that the audio processing unit transmits the M-channel audio stream to the external electronic device in response to the stopping of the N-channel audio stream conversion operation.

The operating method of the electronic device according to one or more embodiments of the present disclosure may further include an operation that the audio processing unit determines the number of audio channels that the external electronic device can support based on the information of the external electronic device.

In the operating method of an electronic device according to one or more embodiments of the present disclosure, an operation of determining whether to stop converting the N-channel audio stream may include the operation of stopping converting the N-channel audio stream in response to the identification that the number of audio channels supported by the external electronic device is not N channels.

In the operating method of an electronic device according to one or more embodiments of the present disclosure, an operation of determining whether to stop converting the N-channel audio stream may include an operation of stopping converting the N-channel audio stream in response to the number of audio channels supported by the external electronic device being two channels.

In the operating method of an electronic device according to one or more embodiments of the present disclosure, an operation of converting into N-channel audio streams may include: an operation of generating N–M dummy data; an operation of generating audio streams of the N–M channels by copying the N–M dummy data to the audio streams of the M channels; and an operation of converting the N-channel audio stream on the basis of the M-channel audio stream and the N–M channel audio stream.

In the operating method of an electronic device according to one or more embodiments of the present disclosure, an operation of generating the audio stream of the N–M channels may include: identifying a port to which first dummy data included in the N–M dummy data is output; selecting an audio stream to be copied from the M-channel audio streams on the basis of the identified port; and converting the first dummy data into an audio stream by copying the selected audio stream.

An operating method of an electronic device according to one or more embodiments of the present disclosure may further include identifying the number of audio channels supported by the external electronic device on the basis of information of the external electronic device and determining the number of dummy data to be generated on the basis of the identified number of channels.

An operating method of an electronic device according to one or more embodiments of the present disclosure may further include receiving state information of the electronic device from the CPU and generating the N-channel audio stream based on the state information of the electronic device.

An operating method of an electronic device according to one or more embodiments of the present disclosure may further include an operation of performing at least one operation for generating the N-channel audio stream based on the information of the output device in response to identifying that the external electronic device is disconnected.

In the operating method of an electronic device according to one or more embodiments of the present disclosure, the output device may output 4-channel audio, and information of the speaker device may include information of at least one of the external electronic device and the output device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A , B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD- ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   an output device configured to output audio;
   an audio output interface configured to receive the audio from the output device and to forward the audio to an external electronic device;
   an Application Processor (AP) comprising a Central Processing Unit (CPU); and
   an audio processing unit configured to:
      receive an audio stream of M channels from the CPU,
      convert the M-channel audio stream into an N-channel audio stream, the N-channel being different from the M-channel,
      output the N-channel audio stream through the output device, wherein the audio processing unit is further configured to:
      detect a connection with the external electronic device through the audio output interface;
      determine whether to stop the converting the M-channel audio stream into the N-channel audio stream, based on information received from the CPU; and
      transmit, via the audio output interface, the M-channel audio stream to the external electronic device in response to the determination of stopping the converting the M-channel audio stream into the N-channel audio stream,
   wherein the audio processing unit is further configured to:
      generate N-M dummy data;
      generate audio streams of N-M channels by copying the N-M dummy data to the the M-channel audio stream; and
      convert the N-channel audio stream on the basis of the M-channel audio stream and the audio streams of N-M channels.

2. The electronic device of claim 1, wherein the audio processing unit is further configured to identify a number of audio channels supported by the external electronic device on the basis of information of the external electronic device.

3. The electronic device of claim 2, wherein the audio processing unit is further configured to stop converting the M-channel audio stream into the N-channel audio stream in response to an identification that the number of audio channels supported by the external electronic device is not N channels.

4. The electronic device of claim 2, wherein the audio processing unit is further configured to stop generating the N-channel audio stream in response to the number of audio channels supported by the external electronic device being 2 channels.

5. The electronic device of claim 1, wherein the audio processing unit is further configured to:
   identify a channel to which first dummy data included in the N−M dummy data is to be output;
   select an audio stream to be copied from the audio streams of the M channels on the basis of the identified channel; and
   convert the first dummy data into an audio stream in a method of copying the selected audio stream.

6. The electronic device of claim 1, wherein the audio processing unit is further configured to:
   identify the number of audio channels supported by the external electronic device on the basis of information of the external electronic device; and
   determine a number of dummy data to be generated on the basis of the identified number of channels.

7. The electronic device of claim 1, wherein the audio processing unit is further configured to receive state information of the electronic device from the CPU and generate the N-channel audio stream based on the state information of the electronic device.

8. The electronic device of claim 1, wherein the audio processing unit is further configured to perform at least one operation of generating the N-channel audio stream based on information of the output device in response to an identification that a connection with the external electronic device is disconnected.

9. The electronic device of claim 1, wherein the output device is configured to outputs 4-channel audio.

10. A method for operating an electronic device, the method comprising:
    receiving a M-channel audio stream from a Central Processing Unit (CPU);
    converting the M-channel audio stream into an N-channel audio stream;
    outputting the N-channel audio stream to an output device supporting N-channel audio output;
    determining where to stop converting the M-channel audio stream into the N-channel audio stream based on information received from the CPU in response to connection of an external electronic device supporting audio having a number of channels that are different from the N-channel; and
    transmitting the M-channel audio stream to the external electronic device in response to the determination to stop converting the M-channel audio stream into the N-channel audio stream,
    wherein the audio processing unit is further configured to:
      generate N−M dummy data;
      generate audio streams of N−M channels by copying the N−M dummy data to the the M-channel audio stream; and
      convert the N-channel audio stream on the basis of the M-channel audio stream and the audio streams of N−M channels.

11. The method of claim 10, wherein the method further comprises identifying a number of audio channels supported by the external electronic device based on information of the external electronic device.

12. The method of claim 11, wherein the determining whether to stop converting the M-channel audio stream into the N-channel audio stream comprises stopping of converting the M-channel audio stream into the N-channel audio stream in response to an identification that a number of audio channels supportable by the external electronic device is not N.

13. The method of claim 11, wherein the determining whether to stop converting the M-channel audio stream into the N-channel audio stream comprises stopping of converting the M-channel audio stream into the N-channel audio stream in response to a number of audio channels supported by the external electronic device being 2 channels.

14. The method of claim 10, wherein the converting the N-channel audio stream comprises:
- generating N–M dummy data;
- generating audio streams of N–M channels by copying the N–M dummy data to the M-channel audio stream; and
- converting the N-channel audio stream based on the M-channel audio stream and the N–M channel audio stream.

\* \* \* \* \*